United States Patent
Sethi et al.

(10) Patent No.: US 11,588,697 B2
(45) Date of Patent: Feb. 21, 2023

(54) NETWORK TIME PARAMETER CONFIGURATION BASED ON LOGICAL HOST GROUP

(71) Applicant: Dell Products L.P., Round Rock, TX (US)

(72) Inventors: Parminder Singh Sethi, Ludhiana (IN); Suren Kumar, Bangalore (IN); Vinod Durairaj, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 17/154,469

(22) Filed: Jan. 21, 2021

(65) Prior Publication Data

US 2022/0231916 A1 Jul. 21, 2022

(51) Int. Cl.
  *G06F 15/16* (2006.01)
  *H04L 41/0893* (2022.01)
  *H04L 69/28* (2022.01)

(52) U.S. Cl.
  CPC .......... *H04L 41/0893* (2013.01); *H04L 69/28* (2013.01)

(58) Field of Classification Search
  CPC ...... G06F 1/14; G06F 1/10; G06F 1/12; H04J 3/0664; H04J 3/0667; H04J 3/0682; H04L 69/28; H04L 41/0889; H04L 41/0893; H04W 56/001
  See application file for complete search history.

(56) References Cited

U.S. PATENT DOCUMENTS

| | | | |
|---|---|---|---|
| 9,246,762 B1* | 1/2016 | Watkins | H04J 3/0641 |
| 10,536,741 B1* | 1/2020 | Madison | H04N 21/43076 |
| 10,643,609 B1* | 5/2020 | Pogue | G10L 15/18 |
| 2003/0221138 A1* | 11/2003 | Shirakawa | G06F 1/14 |
| | | | 713/400 |
| 2006/0153246 A1* | 7/2006 | Aoki | H04L 43/50 |
| | | | 370/508 |
| 2007/0266199 A1* | 11/2007 | Peled | G06F 12/0842 |
| | | | 711/E12.039 |

(Continued)

OTHER PUBLICATIONS

Cisco, "Network Time Protocol (NTP) Commands," Cisco IOS XR Network Time Protocol, 2018, 40 pages.

(Continued)

*Primary Examiner* — Dustin Nguyen
*Assistant Examiner* — Hao H Nguyen
(74) *Attorney, Agent, or Firm* — Ryan, Mason & Lewis, LLP

(57) ABSTRACT

In one embodiment, at least one processing device is configured to assign a plurality of devices of a cluster to a logical host group where at least one of the devices assigned to the logical host group has a network time parameter that is different than another of the devices assigned to the logical host group. The at least one processing device is further configured to determine a target network time parameter for the logical host group based at least in part on network time parameter related information about a given device of the plurality of devices assigned to the logical host group and to cause the plurality of devices to configure their respective network time parameters to the target network time parameter based at least in part on the assignment of the plurality of devices to the logical host group.

20 Claims, 12 Drawing Sheets

(56) References Cited

U.S. PATENT DOCUMENTS

| | | | |
|---|---|---|---|
| 2008/0313268 A1* | 12/2008 | Batalden | H04L 47/564 709/236 |
| 2010/0303100 A1* | 12/2010 | Niamut | H04L 65/80 370/503 |
| 2013/0194926 A1* | 8/2013 | DeCusatis | H04L 47/781 370/468 |
| 2015/0026295 A1* | 1/2015 | Kunieda | H04L 67/131 709/217 |
| 2016/0006804 A1* | 1/2016 | Deshpande | H04L 41/0213 709/248 |
| 2017/0373779 A1* | 12/2017 | Yamakage | H04N 21/64322 |
| 2018/0224884 A1* | 8/2018 | Oshima | G06F 11/0778 |
| 2018/0365121 A1* | 12/2018 | Harneja | G06F 16/2365 |
| 2018/0367387 A1* | 12/2018 | Kompella | H04L 41/0893 |
| 2019/0155327 A1* | 5/2019 | Zaidman | G06F 1/14 |
| 2021/0034605 A1* | 2/2021 | Cai | G06F 16/27 |
| 2022/0103279 A1* | 3/2022 | Angeli | H04J 3/0641 |
| 2022/0121620 A1* | 4/2022 | Rath | G06F 21/602 |

OTHER PUBLICATIONS

D. Mills et al., "Network Time Protocol Version 4: Protocol and Algorithms Specification," Internet Engineering Task Force, Jun. 2010, 110 pages.

* cited by examiner

| Issue ID | Issue Title |
|---|---|
| PSE-6319 | Azure Stack: NTP issues for CS Racks |
| PSE-6142 | Azure Stack: 14g – TOR not communicating with NTP |

NETWORK TIME PARAMETER CONFIGURATION BASED ON LOGICAL HOST GROUP

FIELD

The field relates generally to information processing systems, and more particularly to network time configurations in information processing systems.

BACKGROUND

Device management consoles (DMCs), hypervisor hosts, physical host devices/servers and virtual machines (VMs)/containers are often configured with different network time protocol (NTP) services for time management. In some cases, there may be a time mismatch between the DMC and the physical server, hypervisor host and VM/container which may cause or expose potential functional and security challenges.

In a large datacenter, lab administrators are typically responsible for installing and managing the DMCs and VM administrators are typically responsible for handling the hypervisor administration. In some cases, such a division of labor may create opportunities for possible misconfigurations of the NTP between the DMC, hypervisor hosts, physical host devices, physical servers and hosted VMs/containers.

In a cloud datacenter environment, where there may be a mandate that all physical servers stay in the same time zone, the NTP may be configured to the host devices based on the customer's geographical location. The lab administrators often have to manually configure the NTP settings for all of the host devices which are part of the same cluster. For example, each cluster may be running with a different NTP setting based on how it is configured. Ensuring that the NTP configuration for the host devices in a cluster are the same as the cluster NTP often requires significant manual effort and may be a time-consuming task for the lab administrator. Such manual configurations may also be prone to a potential configuration error.

SUMMARY

In one embodiment, an apparatus comprises at least one processing device comprising a processor coupled to memory. The at least one processing device is configured to assign a plurality of devices of a cluster to a logical host group where at least one of the devices assigned to the logical host group has a network time parameter that is different than another of the devices assigned to the logical host group. The at least one processing device is further configured to determine a target network time parameter for the logical host group based at least in part on network time parameter related information about a given device of the plurality of devices assigned to the logical host group and to cause the plurality of devices to configure their respective network time parameters to the target network time parameter based at least in part on the assignment of the plurality of devices to the logical host group.

These and other illustrative embodiments include, without limitation, apparatus, systems, methods and processor-readable storage media.

BRIEF DESCRIPTION OF THE DRAWINGS

FIG. 3 is a table illustrating example technical support issues in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
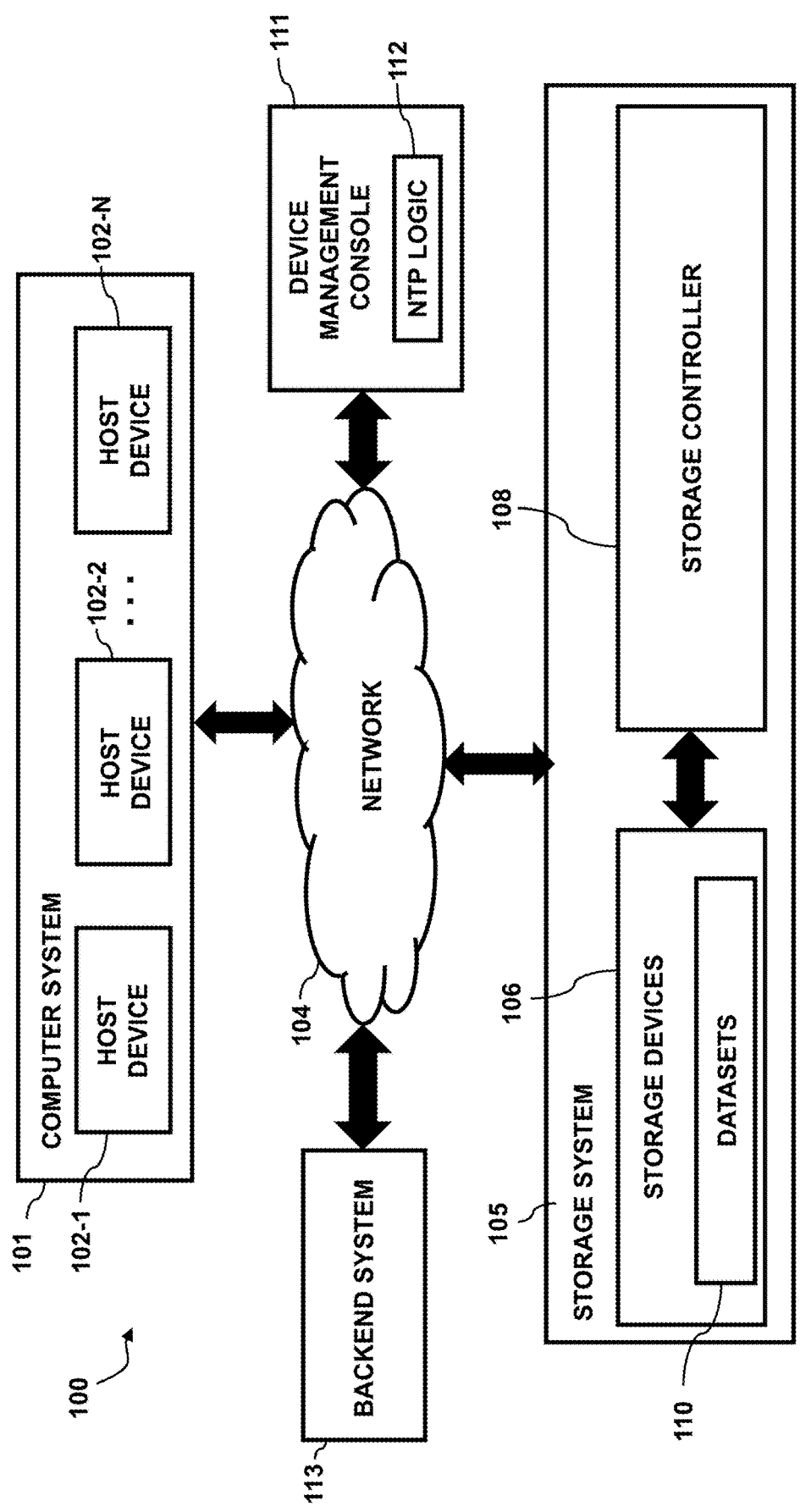
FIG. 1 is a block diagram of an information processing system configured with NTP configuration functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105, a DMC 111 and a backend system 113. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102, storage system 105, DMC 111 and backend system 113 illustratively comprise respective processing devices of one or more processing platforms. For example, the host devices 102, the storage system 105, DMC 111 and backend system 113 can each comprise one or more processing devices each having a processor and a memory, possibly implementing virtual hosts such as, e.g., virtual machines, containers, virtual appliances, or other virtualization infrastructure, although numerous other configurations are possible.

The host devices 102, the storage system 105, the DMC 111 and the backend system 113 can additionally or alternatively be part of cloud infrastructure such as an Amazon Web Services (AWS) system. Other examples of cloud-based systems that can be used to provide one or more of host devices 102, storage system 105, DMC 111 and backend system 113 include Google Cloud Platform (GCP) and Microsoft Azure.

The host devices 102, the storage system 105, the DMC 111 and the backend system 113 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array. Other types of storage arrays can be used to implement storage system 105 in other embodiments.

The storage controller 108 comprises processing devices, memory, or other circuitry that may be utilized, for example, to service IO operations that are received from the host devices 102 or any other operations associated with the storage system 105. While storage controller 108 may be described as comprising particular configurations herein, storage controller 108 is not limited to the disclosed embodiments and may comprise any other configuration of electrical and software components.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays, software-defined storage products, cloud storage products, object-based storage products and scale-out NAS clusters comprising platform nodes and associated accelerators. Combinations of multiple ones of these and other storage products can also be used in implementing a given storage system in an illustrative embodiment.

The storage system 105 should also be understood to include additional modules and other components typically found in conventional implementations of storage systems, although such additional modules and other components are omitted from the figure for clarity and simplicity of illustration.

The DMC 111 comprises processing devices, memory, or other circuitry that may be utilized to manage and support the information processing system 100. In some embodiments, DMC 111 comprises NTP logic 112 that is configured to manage the NTP configuration for the components of the information processing system 100 including, for example, host devices 102, storage system 105, VMs, containers, or other components of the information processing system 100 for which NTP synchronization may be needed. In illustrative embodiments, NTP is provided as one example of a network time parameter that may be utilized. While illustrative embodiments are described herein with reference to NTP, any other network time parameter, protocol or configuration may be alternatively utilized.

The backend system 113 comprises processing devices, memory, or other circuitry that may be utilized to collect and monitor the other components of the information processing system 100 including, for example, monitoring component health, detecting failures and ordering and shipping replacement parts to the customer datacenters.

The host devices 102, the storage system 105, the DMC 111 and the backend system 113 may be implemented on respective distinct processing platforms, although numerous other arrangements are possible. For example, in some embodiments at least portions of the host devices 102, the storage system 105, the DMC 111 and the backend system 113 are implemented on the same processing platform. The storage system 105 can be implemented at least in part within at least one processing platform that implements at least a portion of the host devices 102, DMC 111 or backend system 113. Similarly, the DMC 111 can be implemented at least in part within at least one processing platform that implements at least a portion of the host devices 102, storage system 105 or backend system 113. Likewise, the backend system 113 can be implemented at least in part within at least one processing platform that implements at least a portion of the host devices 102, storage system 105 or DMC 111.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, storage system 105, DMC 111 and backend system 113 to reside in different data centers. Numerous other distributed implementations of one or more of the host devices 102, the storage system 105, DMC 111 and backend system 113 are possible. Accordingly, the host devices 102, storage system 105, DMC 111 and backend system 113 can also be implemented in a distributed manner across multiple data centers.

Additional examples of processing platforms utilized to implement host devices, storage systems, DMCs or backend systems in illustrative embodiments will be described in more detail below in conjunction with FIGS. 11 and 12.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, storage controller 108, datasets 110, DMC 111, backend system 113 and NTP logic 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, the functionality for the NTP logic 112 can be implemented in the DMC, in the backend system, in the storage system, in one or more host devices, partially in the DMC, partially in a host device, partially in a storage system, partially in the backend system, or any combination thereof. Accordingly, illustrative embodiments are not limited to arrangements in which all such functionality is implemented in a DMC, a storage system, a backend system or a host device, and therefore encompass various hybrid arrangements in which the functionality is distributed over one or more DMCs, one or more storage systems, one or more backend systems and one or more associated host devices, each comprising one or more processing devices.

In a cloud datacenter environment, where there may be a mandate that all servers stay in the same time zone, the NTP may be configured to the host devices based on the customer's geographical location. The lab administrators often have to manually configure the NTP settings for all of the host devices which are part of the same cluster.

Figure 2:
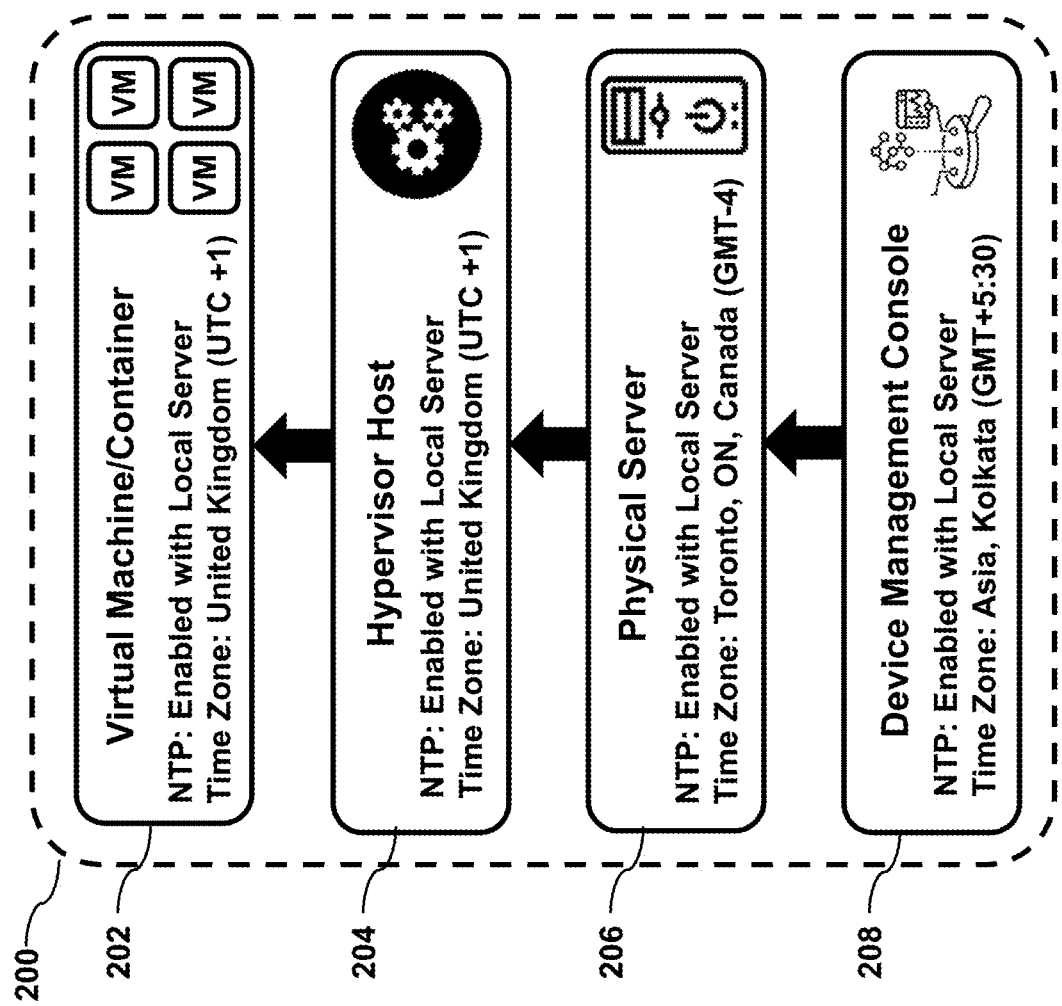
FIG. 2 is a block diagram illustrating an example datacenter environment in an illustrative embodiment.

With reference now to FIG. 2, an example cloud datacenter environment 200 is illustrated. The cloud datacenter environment 200 comprises VMs/containers 202, a hypervisor host 204, a physical server 206 such as, e.g., a baseboard management controller (BMC) or a chassis management controller (CMC), and a DMC 208. While described singularly, cloud data center environment 200 may comprise more than one VM/container 202, hypervisor host 204, physical server 206 and DMC 208 which may be individually or collectively referred to herein respectively as VMs/containers 202, hypervisor hosts 204, physical servers 206 and DMCs 208. In some embodiments, cloud datacenter environment 200 may comprise some or all of the features of information processing system 100 as described with reference to FIG. 1.

As shown in FIG. 2, each cluster or component may be running with a different NTP setting based on how it is configured. For example, the DMC 208 may be running an NTP of GMT+5:30, the physical server 206 may be running an NTP of GMT-4, the hypervisor host 204 may be running an NTP of UTC+1 and the VM/Container may be running an NTP of UTC+1. Ensuring that the NTP configuration for the host devices in a cluster are the same as the cluster NTP often requires significant manual effort and may be a time-consuming task for the lab administrator. Such manual configurations may also be prone to a potential configuration error. In some cases, there may be a time mismatch between the DMC and the physical server, hypervisor host and VM/container which may cause or expose potential functional and security challenges.

Some example types of cyber-attacks may include session hijacking, sniffers and distributed denial of service (DDOS) attacks. Session hijacking is a type of hacking that may occur when an attacker gains access to the session state of a particular user. The attacker then uses the valid session ID to access the server/host. In such a case, all of the login logs and entries may be hidden due to a time mismatch. A sniffer is a program or device that captures the vital information from the network traffic specific to a particular network such as, e.g., passwords, email, the web addresses, etc. A DDOS attack is a malicious attempt to disrupt normal traffic to a web property.

Digital forensics may be utilized to identify or track cyber-attacks. Digital forensics is a process of preservation, identification, extraction and documentation of computer evidence that can be used later by a court of law or in support of post cyber-attack activities such as identification of security breaches and misconfigurations.

In one example scenario, an NTP misconfiguration creates a security loophole that can potentially lead to both internal and external cyber-attacks. When an NTP is configured incorrectly, hackers may utilize forensic or hacking tools that can set or edit the date and time with a different value. This date and time editing may cause the log files to be reconstructed which may make it possible for a user to avoid having information logged relating to login/authentications or system important activities for some brief interval of time which may enable a breach and help destroy evidence for forensic investigations either as part of internal or external attacks. For example, if the server has been configured with a lag of two days from the current time and an attacking user accesses the server, the server generates an alert/log for the attacking user accessing the system. However, the log is triggered or reported two days back in time in the logs list due to the server NTP configuration which will not necessarily be visible to the lab administrator. In some scenarios, a cyber-attack also may utilize a time mismatch to create a security loophole.

In another example scenario, the NTP configuration settings for each host device in a cluster environment needs to be configured with some manual intelligence. For example, a clock skew may be detected due to an NTP configuration mismatch between the host devices and the cluster. Clock skew, sometimes called timing skew, is a phenomenon in synchronous digital circuit systems such as computer systems in which the same sourced clock signal arrives at different components at different times. The instantaneous difference between the readings of any two clocks is called their skew. Such a clock skew is one of the most common reasons for VM migration failures in production and may lead to a re-initialization of migration activities, migration failures, inaccessible shares or host devices that are out of domain.

There are many issues related to NTP misconfigurations that are reported to a technical support team. These NTP misconfigurations often require substantial time, effort and resources of the technical support team for analyzing and fixing the time related issues. For example, depending on the volume of reported issues, it may take anywhere from, for example, 7-24 days on average for an issue to be addressed and closed.

With reference now to FIG. 3, a table 300 illustrates two example issues that may be reported by users of a cloud environment. As seen in FIG. 3, for example, even in a cloud environment, NTP and time misconfigurations may create operational and security issues. As an example, in issue PSE-6319 the user has ten cloud tenants where eight tenant racks can communicate with an NTP server and the other two tenant racks are in a cloud environment. The other two tenant racks are misconfigured with the NTP server which has resulted in operational failures. As mentioned above, such an NTP issue may impact both the operation and the security of the information processing system.

The NTP logic 112 (FIG. 1) of the DMC 111 implements NTP configuration functionality that provides end-to-end automated intelligence to identify the appropriate NTP configurations based on, for example, the customer's geographical location and cluster to host device to VM configurations. The NTP configuration functionality utilizes data stored on a backend system 113 (FIG. 1) such as, e.g., a backend technical support server, to identify the location of the corresponding datacenter and to apply the appropriate NTP configuration. The backend system 113 may comprise, for example, one or more servers or computing devices associated with the vendor or management entity of the clusters or host devices on which the customer's data is stored.

Using an operating system (OS) passthrough channel such as a technical support software, information about the hypervisor may be collected including, for example, the host cluster names, cluster details, what VMs are hosted on the host devices of the clusters, hypervisor host resource utilization and health details, or other information about the host devices, hypervisor, VMs and clusters.

The NTP configuration functionality enhances the DMC 111 by generating logical host groups (LHGs) for easy management of cluster, host device and VM relationships with respect to the NTP. For example, in some embodiments, whichever host devices 102 are part of the same cluster may be added on to same LHG in the DMC 111.

When there is an NTP configuration mismatch or a clock skew is detected between the hypervisor host 204 and the DMC 208 of FIG. 2, an alert may be generated and sent to the backend system 113 of FIG. 1 using an existing alert channel and logging mechanism of the backend system 113.

When a new host device, server or host is added to the DMC 111, the NTP for that new device, server or host may be automatically configured and maintained without any further human intervention using the NTP configuration functionality where, for example, the new host device is added to a corresponding LHG.

Figure 4:
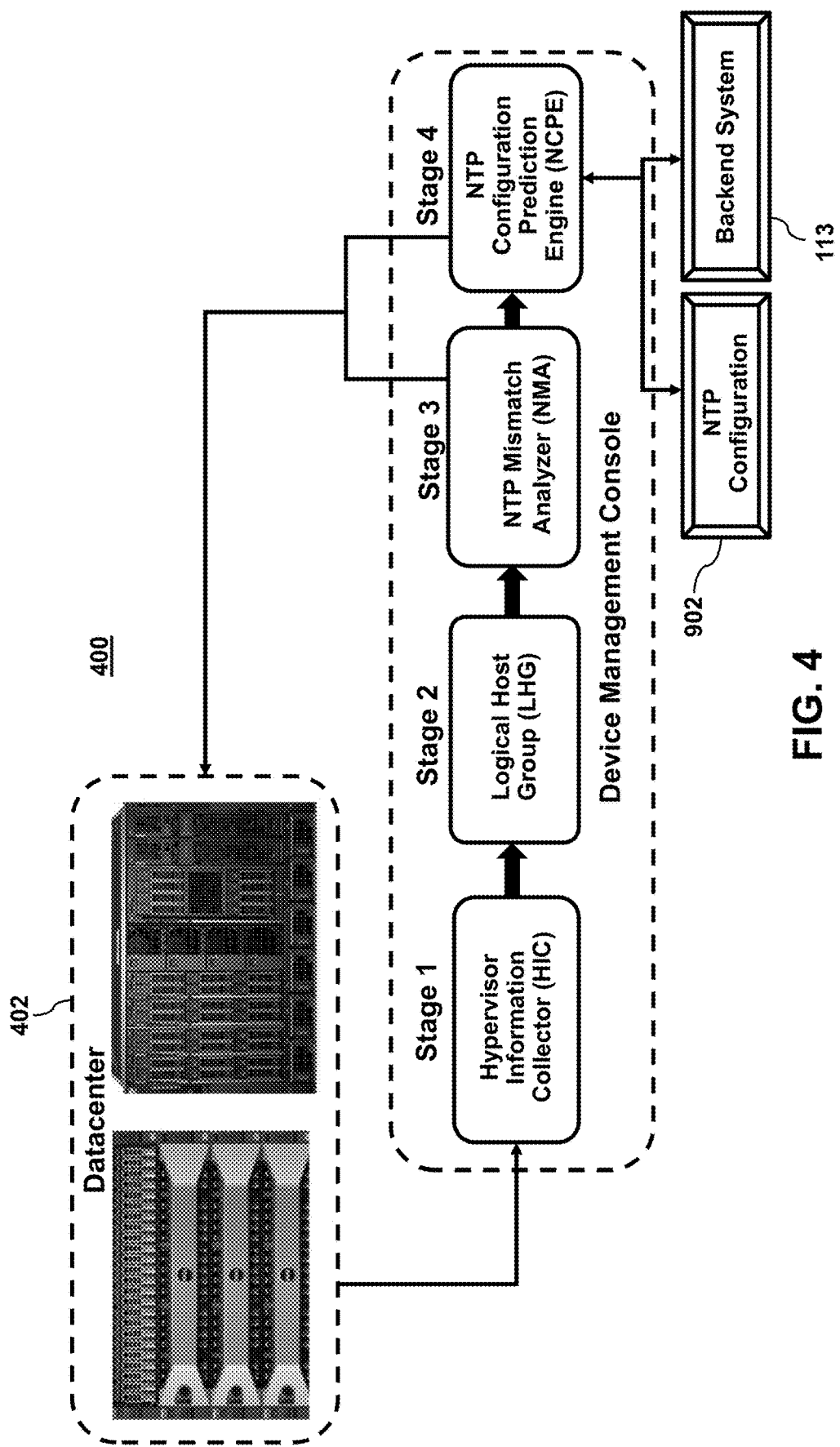
FIG. 4 is a flow diagram illustrating an example process for NTP configuration in an illustrative embodiment.

In some example scenarios, customers may operate the servers from different geographical locations where multiple NTP configurations provide an option to the lab administrator to configure the region-specific time zone for a particular LHG. Hosts/VMs which are part of that LHG will then have their NTP configured as a group according to their region-specific time zone. FIG. 4 shows an example process and configuration 400 of the NTP configuration functionality implemented by NTP logic 112 according to an illustrative embodiment. The various stages and components of the process 400 of FIG. 4 will now be described in more detail with reference also to FIGS. 5-9.

Figure 5:
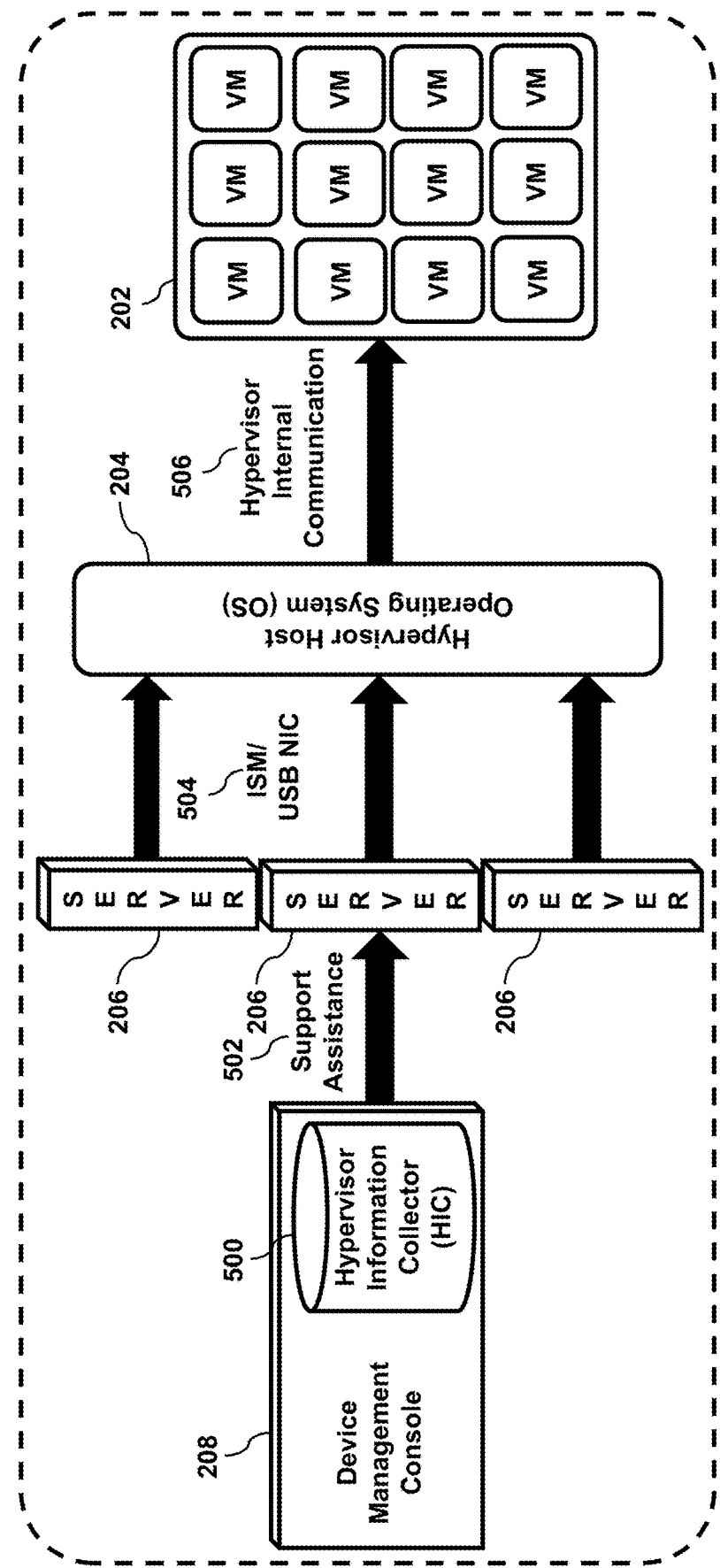
FIG. 5 is a block diagram illustrating an example information flow in the datacenter environment of FIG. 2 in an illustrative embodiment.

At stage 1, with reference FIG. 5, a hypervisor information collector (HIC) 500 of DMC 208 is utilized to obtain information about the hypervisor host 204 and other components of the system such as, e.g., physical servers 206, VM/containers 202, etc. For example, the HIC 500 is configured to cause technical support software or support assistance software 502 to communicate with the BMC of one or more servers 206 which uses components such as a remote access controller service module (ISM)/universal serial bus network interface card (USB NIC) 504 to access the OS of the hypervisor host 204. The DMC 208 is then able to collect the server/host telemetry details using an OS pass-through hypervisor internal communication channel 506 to access the VMs 202. For example, the HIC 500 utilizes the hypervisor internal communication channel 506 to collect information about the hypervisor such as the host cluster's name, host details of different clusters, information about the different hosted VMs 202, or other similar information. In some cases, the DMC 208 may be utilized by the lab administrator to discover the IP range of the servers in the datacenter and the HIC 500 is utilized to collect the required information. Depending on the particular types of cluster, hypervisor OS or VMs involved, various commands may be utilized by the HIC 500 to collect information from the BMCs of the physical servers 206, the OS of the hypervisor host 204 and VMs 202. For example, a getconfig command may be utilized to obtain physical server configuration information and a getsysinfo command may be utilized to obtain software and firmware information.

Figure 6:
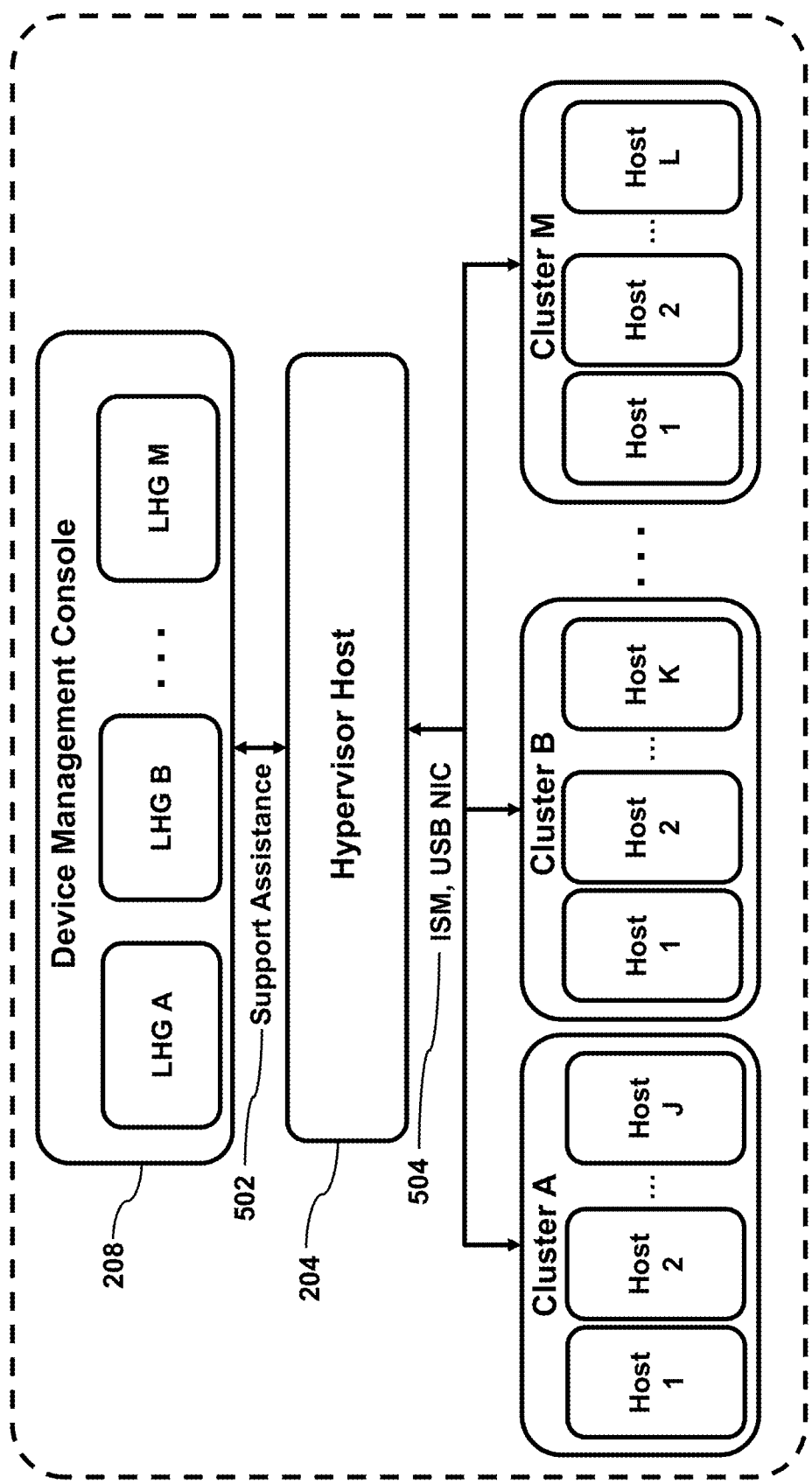
FIG. 6 is a block diagram illustrating an example assignment of logical host groups (LHGs) in the datacenter environment of FIG. 2 in an illustrative embodiment.

At stage 2, the NTP logic 112 implemented NTP configuration functionality generates LHGs. As shown in FIG. 6, DMC 208 communicates with the hypervisor host 204 via technical support software or support assistance software 502, e.g., using the HIC 500, in a similar manner to that described above for FIG. 5. LHGs are automatically generated by the NTP configuration functionality in the DMC 208 using the information obtained by the HIC 500 for the hypervisor host 204 and any clusters, e.g., clusters A, B . . . M, managed by the hypervisor host 204 via the ISM/USB NIC 504. As shown in FIG. 6, an LHG may be generated for each corresponding cluster. For example, an LHG A may be generated for cluster A, an LHG B may be generated for cluster B . . . and an LHG M may be generated for cluster M. Each cluster comprises a plurality of host devices, e.g., hosts 1, 2 . . . J for cluster A, hosts 1, 2 . . . K for cluster B and hosts 1, 2 . . . L for cluster M, which are collectively managed by the LHG for that cluster. While described with different letters, any of clusters A-M may have the same number of host devices or a different number of host devices.

An LHG is a monitoring folder which gets generated automatically in the DMC 208 by the NTP configuration functionality and any discovered servers or hosts are added to the appropriate LHG based on its cluster's configuration. For example, as shown in FIG. 6, cluster A has J host devices, cluster B has K host devices and cluster M has L host devices. In this example, an LHG is created for each cluster and includes all host devices that are part of that cluster.

In some embodiments, a given LHG may comprise multiple clusters or a sub-set of the host devices in a particular cluster. In some embodiments, host devices may be linked together in a LHG without being part of the same cluster or without even being part of a cluster. In some embodiments, the time zone of the host devices may dictate which LHG they are added to rather than which cluster they are a part of. In some embodiments, host devices found in the same time zone may be included in different LHGs. In some embodiments, the LHG may comprise a limited number of host devices where, for example, excess host devices may be grouped into another LHG even if the criteria for including the host devices in the same LHG are met.

Figure 7:
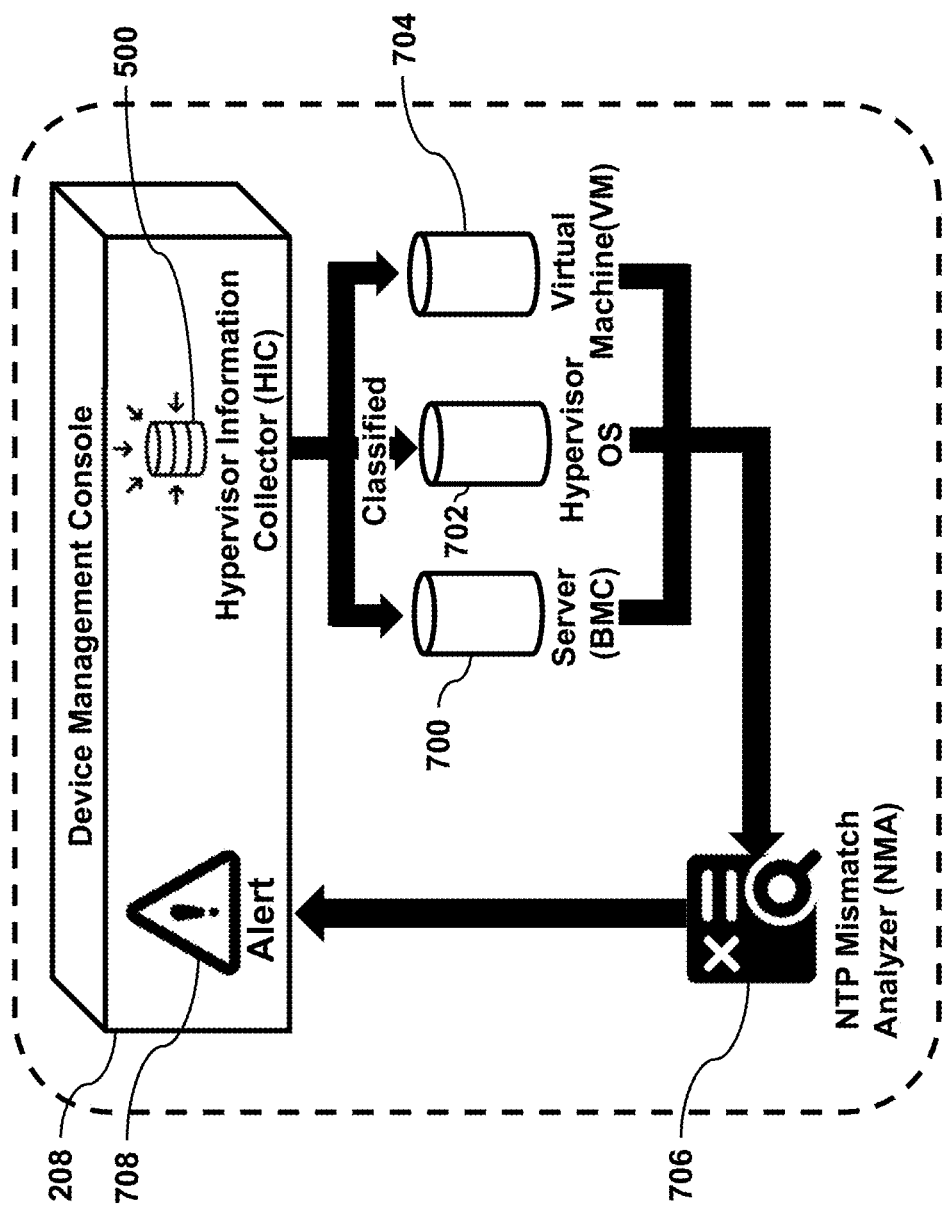
FIG. 7 is a flow diagram illustrating an example process and configuration for determining an NTP mismatch in an illustrative embodiment.
Figure 8:
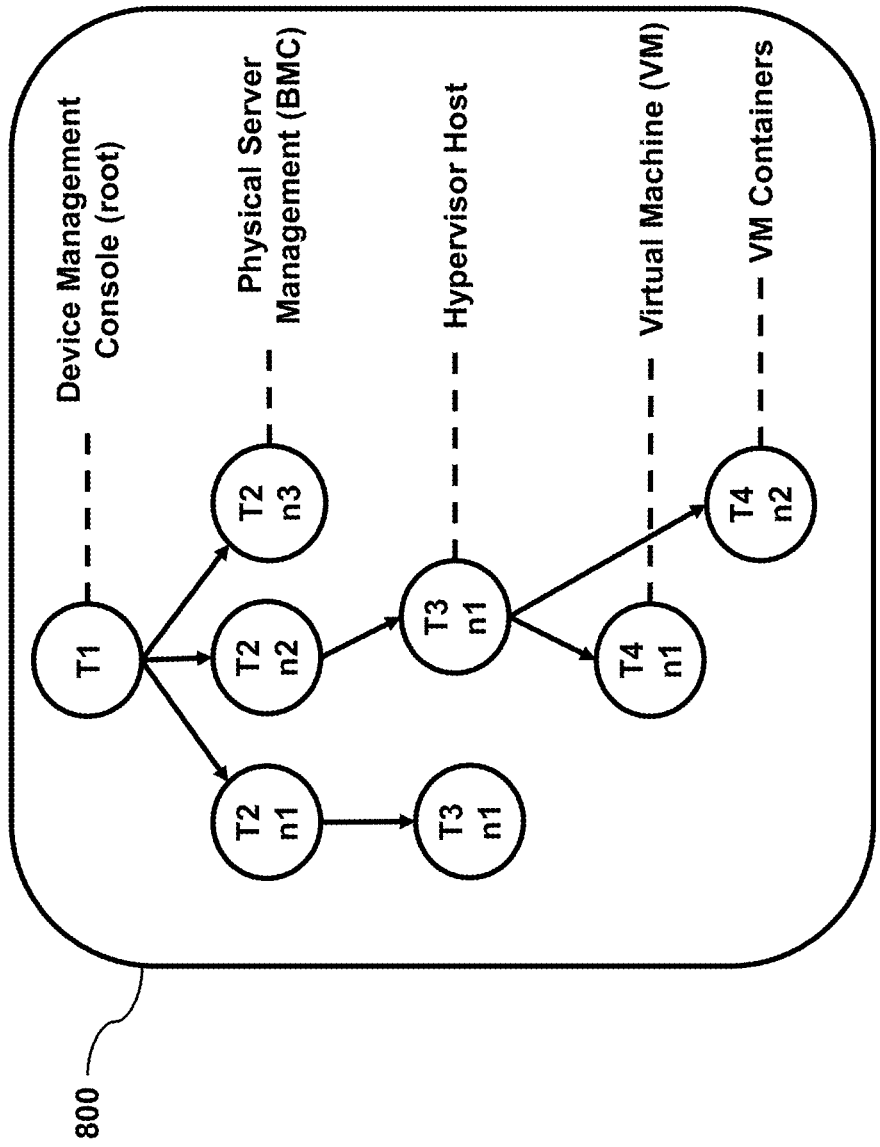
FIG. 8 is a block diagram illustrating an example node structure for determining an NTP mismatch according to the process and configuration of FIG. 7 in an illustrative embodiment.

At stage 3, with reference also now to FIG. 7, the information and other data collected by HIC 500 in stage 1 is classified into BMC information 700, hypervisor OS information 702 and VM information 704 and is analyzed by an NTP Mismatch Analyzer (NMA) 706 to determine whether or not there are any time mismatches. When an NTP mismatch is detected in any of the BMC information 700, hypervisor OS information 702 or VM information 704 by the NMA 706, the NMA 706 is configured to generate an alert 708 and provide the alert 708 to the lab administrator of the DMC 208, e.g., via SNMP. In some embodiments NMA 706 is implemented by the DMC 208.

In a typical system, whenever there is a time mismatch of more than one day, a web browser provides a warning message for a wrong time configuration. However, if the time difference is less than a day, the web browser typically does not provide any warning message about the time interval of the mismatch. Given that this mismatch may occur due to an incorrect NTP or time zone configuration, which may have a few hours of time difference from the actual time, such functionality may not be sufficient to inhibit or correct a potential security issue. In such a case, the NMA 706 is configured to analyze the information collected by the HIC 500 to determine whether there are any time mismatches between the BMC, Hypervisor Hosts and VMs, including time mismatches that are less than a day, and provide an alert 708 to the lab administrator of the DMC 208.

An example process implemented by the NMA 706 for identifying an NTP mismatch will now be described. Timestamps are captured by the HIC 500 in stage 1 for all of the different nodes, e.g., DMC 208, BMC management of the physical servers 206, hypervisor hosts 204, and VM/containers 202. As illustrated in the node diagram 800 of FIG. 8, root time T1 is the time on the DMC 208, time T2 is the time on physical servers 206, time T3 is the time on the hypervisor hosts 204 and time T4 is the time on VM/containers 202.

Based on this information, a time mismatch may be calculated by the NMA 706 according to equations (1)-(6) as follows:

Time difference between root DMC 208 and the physical server 206:

$$T1-T2=0>\text{No alert generated} \quad (1)$$

$$HT1-T21>0==>\text{Alert 708 generated(LogID:001)} \quad (2)$$

Time difference between root DMC 208 and hypervisor host 204:

$$T1-T3=0>\text{No alert generated} \quad (3)$$

$$T31>0==>\text{Alert 708 generated(LogID:002)} \quad (4)$$

Time difference between root DMC 208 and VM/container 202:

$$T1-T4=0>\text{No alert generated} \quad (5)$$

$$T41>0==>\text{Alert 708 generated(LogID:003)} \quad (6)$$

The NMA 706 generates the appropriate alert 708 based on equations (1)-(6) if there are any time differences between the root DMC 208 and any of the other components such as, e.g., the physical server 206, the hypervisor host 204, the VM/container 202 or any other component. For example, according to equations (1), (3) and (5), if the time difference is 0, no alert 708 is generated. However, according to equations (2), (4) and (6), if there is any time difference between the root DMC 208 and the corresponding component, a corresponding alert 708 is generated by the NMA 706 for that component. For example, the LogID value of the alert 708 may correspond to the particular component that has the time difference, e.g., 001 for the physical server 206, 002 for the hypervisor host 204 and 003 for the VM/container 202. In some embodiments, a relatively small time difference such as, e.g., less than a few seconds, less than a few minutes or any other amount of time, may not trigger an alert.

Figure 9:
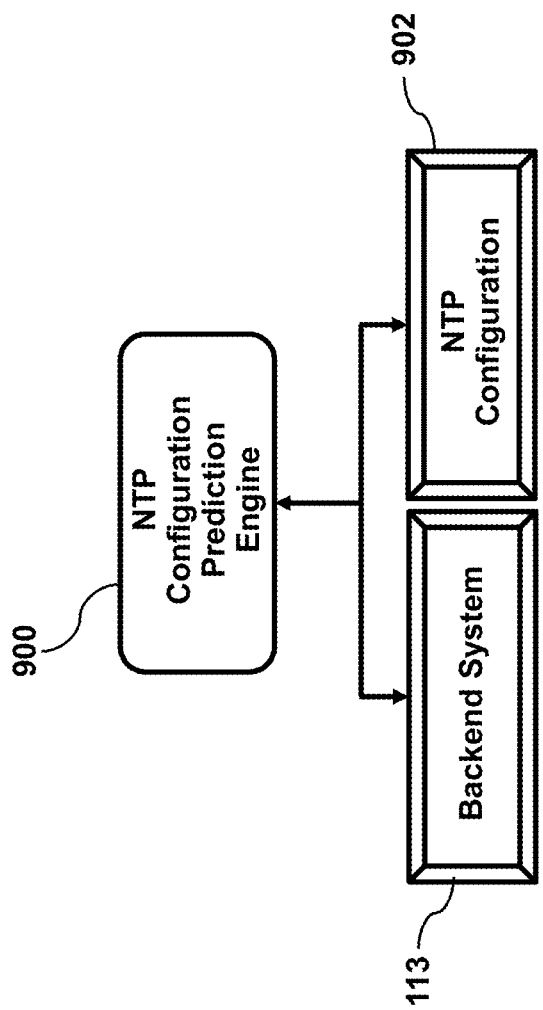
FIG. 9 is a block diagram illustrating an interaction of an example NTP configuration prediction engine (NCPE) with a backend server to generate NTP configurations for the datacenter environment of FIG. 2 in an illustrative embodiment.

At stage 4, with reference to FIG. 9, an NTP configuration Predicting Engine (NCPE) 900 implemented by the DMC 208 is configured to take an action in response to an alert 708. In some embodiments, as part of a technical support registration process, a customer may provide address and location details for their clusters, servers and host devices to the backend system 113. For example, the customer may provide these details in order to take advantage of functionality for the automatic replacement and shipment of hardware to the customer's datacenter.

The NCPE 900 connects to the backend system 113 and obtains the information provided by the customer to identify the geographical location of the customer datacenter 402 (FIG. 4) or other devices and obtain other information related to the customer's data center or other devices. The NCPE 900 builds an NTP time configuration for the customer's datacenter, host devices 102, physical servers 206, hypervisor hosts 204 and VMs/containers 202 based on this information. For example, NCPE 900 may issue commands to the backend system 113 to obtain the customer information.

The NCPE 900 utilizes a global NTP server IP address along with the identified time zone or geographic location for the customer's datacenter 402 to generate an NTP configuration 902 for that datacenter 402. For example, if the customer is operating the servers from more than one geographical location, an NTP configuration 902 provides an option for a lab administrator to configure the region-specific time zone for the particular LHG that comprises those servers. For example, NCPE 900 may generate an NTP configuration 902 for the host devices 102, hypervisor hosts 204, physical servers 206 and VM/containers 202 which are part of the same LHG according to the information about the customer datacenter that is obtained from the backend system 113 by the NCPE 900. As an example, where the host device 102, hypervisor hosts 204, physical servers 206 and VM/containers 202 are located in different regions, or regions different than the DMC 208, the NTP configuration 902 may comprise a target NTP time that corresponds to one of those regions, e.g., UTC+1. In such a case, the physical server 206 and DMC 208 would also be configured to the target time of UTC+1 to inhibit the occurrence of any time mismatches based on the NTP configuration 902. For example, the DMC 208 may provide the NTP configuration to the datacenter 402 to cause configuration changes on the devices of the datacenter 402 to the target time.

The disclosed NTP configuration functionality implemented by the NTP logic 112 provides end to end intelligence to manage the NTP configurations of the physical servers 206, hypervisor hosts 204 and VM/containers 202 via the DMC 208 by grouping related system components into LHGs. NTP time misconfigurations are identified and alerted to the DMC 208 utilizing the NMA 706 for devices that are under the same logical umbrella, e.g., in the same LHG. This enables the DMC 208 to take a pro-active action to generate an NTP configuration 902 for reconfiguring the NTPs of the system components utilizing the NCPE 900. The NTP configuration 902 may then be implemented before the customer is even aware that there may be an issue related to an NTP time misconfiguration. As noted above, the NTP configuration functionality also handles mismatches even when the difference between the times is less than 24 hours.

The functionality of NCPE 900 analyzes all of the different available configurations of VMs, host devices and clusters and provides a recommendation to the lab administrator with the best fit NTP configuration 902 of the NTP across the different VMs, host devices and clusters by using the available set of different NTP configurations 902 specified in the LHGs.

In one example scenario, a datacenter has the same NTP for all physical servers 206, hypervisor hosts 204 and VM/clusters 202 in a cluster. The NTP configuration functionality generates an LHG in the DMC 208 based on the cluster and obtains the geographical location of the datacenter by using the HIC 500 to connect to the backend system 113. Based on the obtained datacenter geographical location, the NCPE 900 creates the NTP configuration 902 and the DMC 208 applies the configuration to all of the physical servers 206, hypervisor hosts 204 and VM/clusters 202 which are included in the LHG as part of the datacenter clusters by using the existing pass-through channels. Whenever a new physical server 206, hypervisor host 204 or VM/container 202 is added to DMC 208, the new physical server 206, hypervisor host 204 or VM/container 202 is added to the corresponding LHG for that cluster and the NTP configuration 902 for that new physical server 206, hypervisor host 204 or VM/container 202 is automatically configured. In such embodiments, the NTP configuration functionality may be fully automated without requiring further user intervention.

In another example scenario, a customer datacenter has different NTPs based on the locations for the physical server 206, hypervisor host 204 and VM/container 202. In such an example scenario, the NTP configuration functionality generates an LHG based on the cluster and utilizes the HIC 500 to obtain the geographical location of the datacenter from the backend system 113. Along with default NTPs which were created based on geographical locations, a lab administrator also is given the option to create a customized NTP for the specific LHG. For example, the DMC 208 and the physical server 206 may be hosted and managed in Asia/Kolkata and the hypervisor hosts 204 and VM/containers 202 may be hosted UK/London. In this case, the lab administrator may assign all of these components, e.g., the physical server 206, hypervisor host 204 and VM/container 202, to the same LHG and assign a target NTP to the LHG, e.g., the Asia/Kolkata time of the DMC 208, such that the Nap's physical server 206, hypervisor host 204 and VM/container 202 are configured with the NTP time of the DMC 208, e.g., the Asia/Kolkata. In such an embodiment, the NTP configuration functionality may be partially automated and may also act based on received user inputs from the lab administrator which select a target NTP time to be used for the entire LHG.

Figure 10:
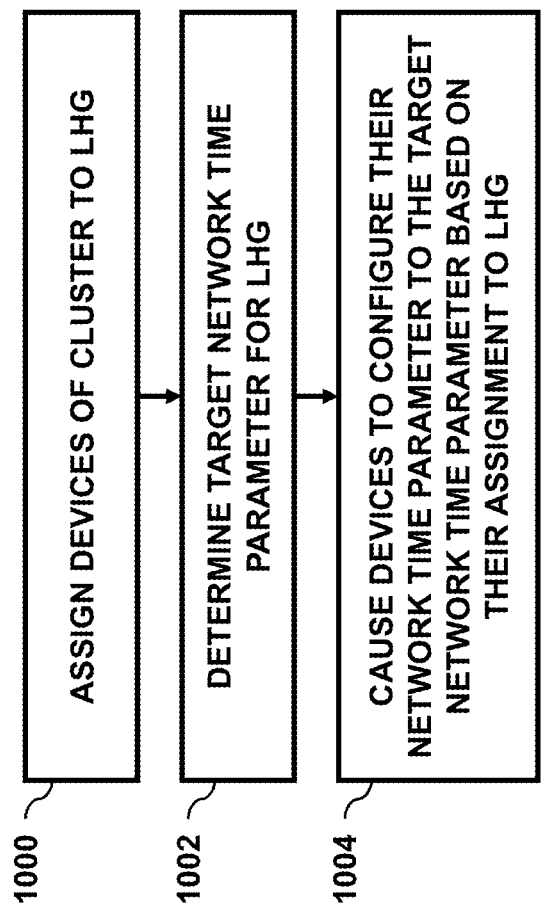
FIG. 10 is a flow diagram of an example process for performing NTP configuration in an illustrative embodiment.

Illustrative embodiments of the techniques and NTP configuration functionality implemented by NTP logic 112 will now be described in more detail with reference to the example process shown in the flow diagram of FIG. 10. The process as shown in FIG. 10 includes steps 1000 through 1004 and is suitable for use in the system 100 but is more generally applicable to other types of systems comprising multiple host devices and a shared storage system. The process will be described with reference also to FIGS. 2-9.

At step 1000, the NTP configuration functionality implemented by NTP logic 112 assigns a plurality of devices of a cluster to an LHG in the DMC 208. For example, the devices may be assigned according to their cluster, geographic location or in any of the other manners described above. In this example process, at least one of the devices assigned to the LHG may have an NTP time that is different than another of the devices assigned to the LHG.

At step 1002, the NTP configuration functionality determines a target network time parameter for the LHG based at least in part on network time parameter related information about a given device of the plurality of devices assigned to the LHG. For example, the HIC 500 may obtain information about the various devices that are assigned to the LHG either directly via hypervisor related interfaces such as described with reference to FIG. 5 or from the backend system 113. The target network time parameter may be determined based on, for example, a geographic region in which one or more of the devices is located, a geographic region associated with the DMC or in any of the other manners described above.

At step 1004, the NTP configuration functionality causes the plurality of devices to configure their respective network time parameters to the target network time parameter based at least in part on the assignment of the plurality of devices to the LHG. For example, the NCPE 900 may generate an NTP configuration 902 for the LHG that is utilized by the DMC 208 to cause a configuration of the respective network time parameters of the devices to the target network time parameter.

It is to be understood that for any methodologies described herein with reference to the flow diagram of FIG. 10, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 108 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 or the storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

Illustrative embodiments of processing platforms utilized to implement host devices and storage systems with NTP configuration functionality will now be described in greater detail with reference to FIGS. 11 and 12. Although described in the context of system 100, these platforms may also be used to implement at least portions of other information processing systems in other embodiments.

Figure 11:
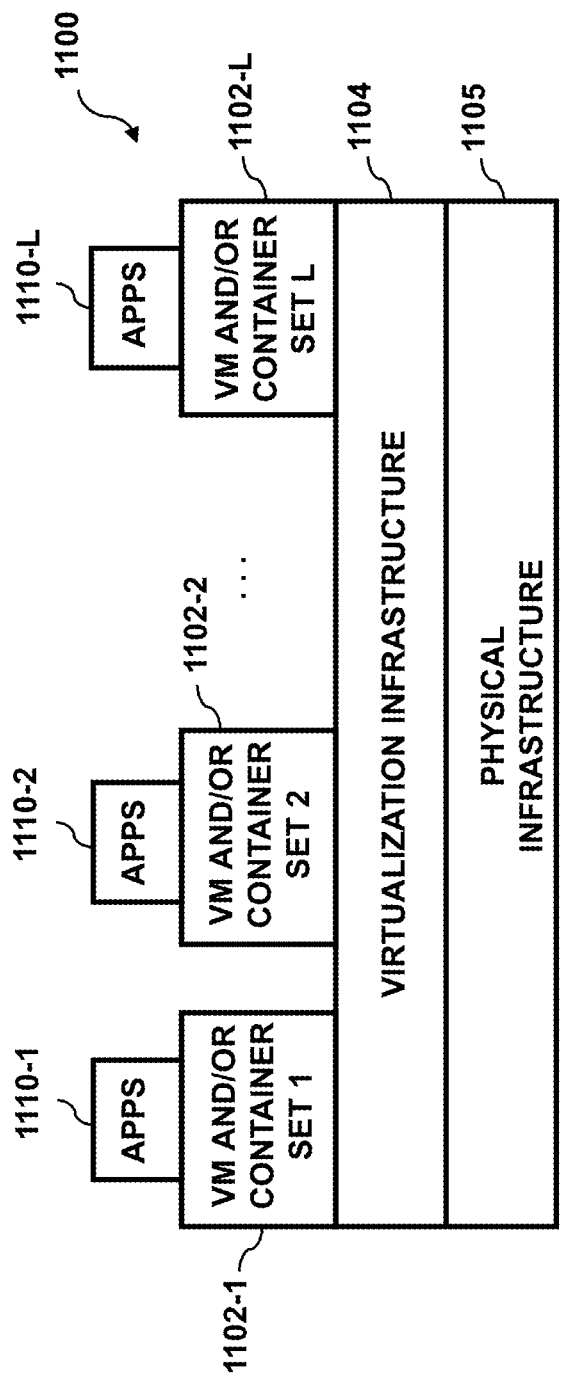
FIGS. 11 and 12 show examples of processing platforms that may be utilized to implement at least a portion of an information processing system in illustrative embodiments.
Figure 12:
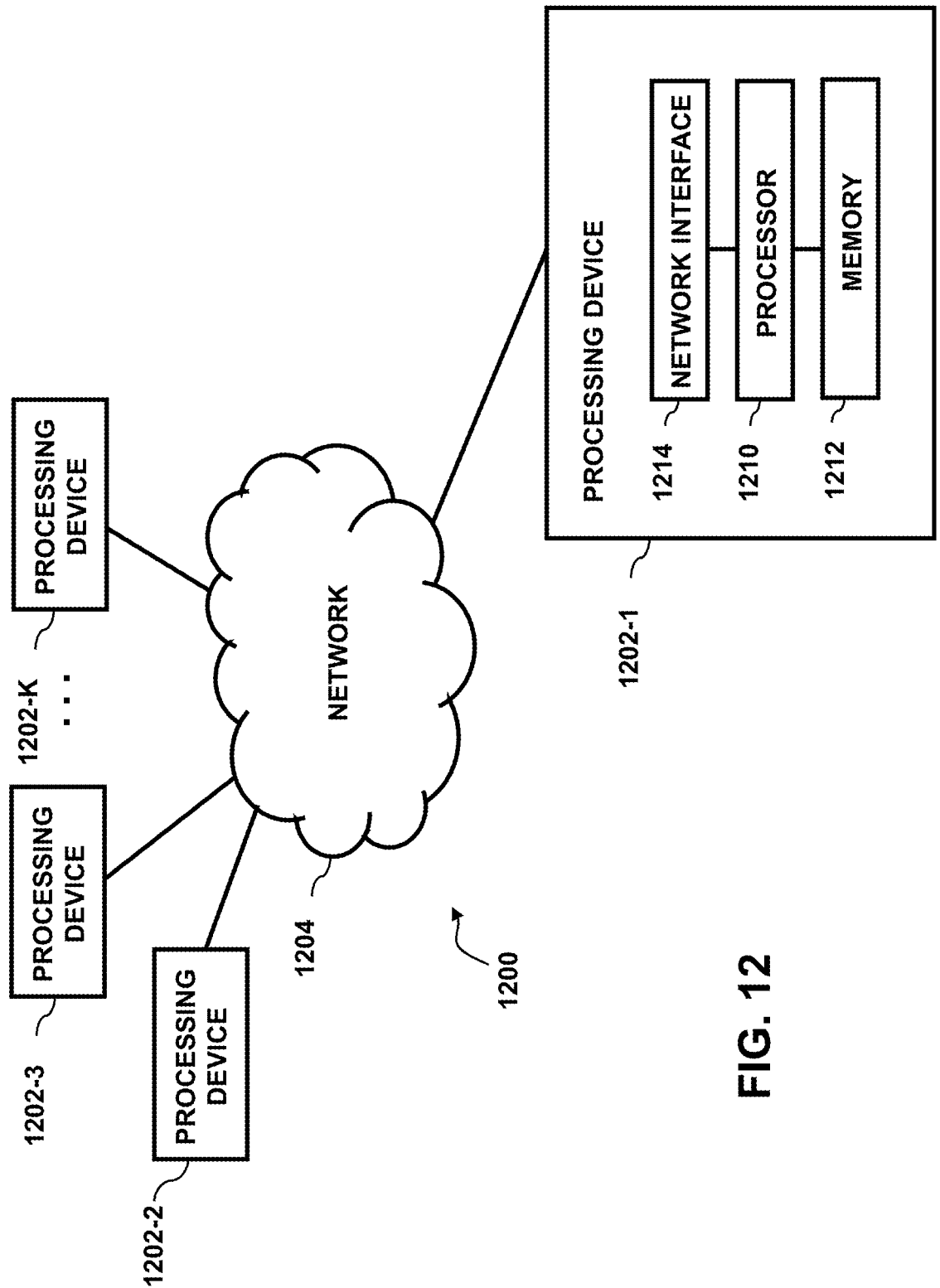

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide functionality of the type described above in the illustrative embodiments for one or more processes running on a given one of the VMs. For example, each of the VMs can implement the above-described functionality of the illustrative embodiments in the system 100.

A hypervisor platform that implements a hypervisor within the virtualization infrastructure 1104 may comprise an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can also provide functionality of the type described above in the illustrative embodiments. For example, a container host device supporting multiple containers of one or more container sets can implement one or more cores executing the above-described functionality of the illustrative embodiments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of a storage system as disclosed above in the illustrative embodiments are illustratively implemented in the form of software running on one or more processing devices.

It should again be emphasized that the above-described embodiments are presented for purposes of illustration only. Many variations and other alternative embodiments may be used. For example, the disclosed techniques and functionality described above in the illustrative embodiments are applicable to a wide variety of other types of information processing systems, host devices, storage systems, DMCs, backend systems or other systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to memory, the at least one processing device being configured:
    to assign a plurality of devices of a cluster to a logical host group, wherein at least one of the devices assigned to the logical host group has a network time parameter that is different than another of the devices assigned to the logical host group;
    to determine a target network time parameter for the logical host group based at least in part on network time parameter related information about a given device of the plurality of devices assigned to the logical host group; and
    to cause the plurality of devices to configure their respective network time parameters to the target network time parameter based at least in part on the assignment of the plurality of devices to the logical host group;
    wherein the logical host group is managed by a device management console;
    wherein the at least one processing device is further configured:
        to issue a command to a support system, the command requesting the network time parameter related information about the given device; and
        to obtain the network time parameter related information about the given device from the support system in response to the command;
    wherein determining the target network time parameter for the logical host group based at least in part on the network time parameter related information about the given device comprises determining the target network time parameter based at least in part on the network time parameter related information obtained in response to the command from the support system; and
    wherein the at least one processing device is further configured:
        to determine that there is a network time parameter mismatch between at least one of the plurality of devices assigned to the logical host group and the device management console; and
        responsive to the network time parameter mismatch exceeding a designated threshold, to generate an alert.

2. The apparatus of claim 1 wherein the support system comprises a backend technical support system.

3. The apparatus of claim 2 wherein the network time parameter related information comprises a geographical region in which the given device is located.

4. The apparatus of claim 1 wherein assigning the plurality of devices to the logical host group comprises assigning a physical server, a hypervisor host and a virtual machine to the logical host group.

5. The apparatus of claim 1 wherein causing the plurality of devices to configure their respective network time parameters to the target network time parameter comprises causing the plurality of devices to configure their respective network time parameters to the target network time parameter based at least in part on the determination that there is a network time parameter mismatch between the at least one of the plurality of devices assigned to the logical host group and the device management console.

6. The apparatus of claim 5 wherein determining that there is a network time parameter mismatch in the plurality of devices assigned to the logical host group comprises:
    comparing a network time parameter of the device management console to a network time parameter of the at least one of the plurality of devices;

determining, based at least in part on the comparison, that there is a difference between the network time parameter of the device management console and the network time parameter of the at least one of the plurality of devices; and determining that there is a time mismatch based at least in part on the determination that there is a difference between the network time parameter of the device management console and the network time parameter of the at least one of the plurality of devices.

7. The apparatus of claim 1:
wherein the cluster comprises a first cluster;
wherein the device management console is configured to manage a plurality of clusters comprising the first cluster and at least a second cluster; and
wherein the at least one processing device is further configured:
to assign a second plurality of devices of the second cluster to a second logical host group in the device management console;
to determine a second target network time parameter for the second logical host group on network time parameter related information about a second device of the second plurality of devices assigned to the second logical host group; and
to cause the second plurality of devices to configure their respective network time parameters to the second target network time parameter based at least in part on the assignment of the second plurality of devices to the second logical host group.

8. A method comprising:
assigning a plurality of devices of a cluster to a logical host group, wherein at least one of the devices assigned to the logical host group has a network time parameter that is different than another of the devices assigned to the logical host group;
determining a target network time parameter for the logical host group based at least in part on network time parameter related information about a given device of the plurality of devices assigned to the logical host group; and
causing the plurality of devices to configure their respective network time parameters to the target network time parameter based at least in part on the assignment of the plurality of devices to the logical host group;
wherein the logical host group is managed by a device management console;
wherein the method further comprises:
issuing a command to a support system, the command requesting the network time parameter related information about the given device; and
obtaining the network time parameter related information about the given device from the support system in response to the command;
wherein determining the target network time parameter for the logical host group based at least in part on the network time parameter related information about the given device comprises determining the target network time parameter based at least in part on the network time parameter related information obtained in response to the command from the support system;
wherein the method further comprises:
determining that there is a network time parameter mismatch between at least one of the plurality of devices assigned to the logical host group and the device management console; and responsive to the network time parameter mismatch exceeding a designated threshold, generating an alert; and wherein the method is implemented by at least one processing device comprising a processor coupled to memory.

9. The method of claim 8 wherein the support system comprises a backend technical support system.

10. The method of claim 9 wherein the network time parameter related information comprises a geographical region in which the given device is located.

11. The method of claim 8 wherein assigning the plurality of devices to the logical host group comprises assigning a physical server, a hypervisor host and a virtual machine to the logical host group.

12. The method of claim 8 wherein causing the plurality of devices to configure their respective network time parameters to the target network time parameter comprises causing the plurality of devices to configure their respective network time parameters to the target network time parameter based at least in part on the determination that there is a network time parameter mismatch between the at least one of the plurality of devices assigned to the logical host group and the device management console.

13. The method of claim 12 wherein determining that there is a network time parameter mismatch in the plurality of devices assigned to the logical host group comprises:
comparing a network time parameter of the device management console to a network time parameter of the at least one of the plurality of devices;
determining, based at least in part on the comparison, that there is a difference between the network time parameter of the device management console and the network time parameter of the at least one of the plurality of devices; and
determining that there is a time mismatch based at least in part on the determination that there is a difference between the network time parameter of the device management console and the network time parameter of the at least one of the plurality of devices.

14. The method of claim 8:
wherein the cluster comprises a first cluster;
wherein the device management console is configured to manage a plurality of clusters comprising the first cluster and at least a second cluster; and
wherein the method further comprises:
assigning a second plurality of devices of the second cluster to a second logical host group in the device management console;
determining a second target network time parameter for the second logical host group on network time parameter related information about a second device of the second plurality of devices assigned to the second logical host group; and
causing the second plurality of devices to configure their respective network time parameters to the second target network time parameter based at least in part on the assignment of the second plurality of devices to the second logical host group.

15. A computer program product comprising a non-transitory processor-readable storage medium having stored therein program code of one or more software programs, the program code being executable by at least one processing device, the at least one processing device comprising a processor coupled to memory, wherein the program code, when executed by the at least one processing device, causes the at least one processing device:

to assign a plurality of devices of a cluster to a logical host group, wherein at least one of the devices assigned to the logical host group has a network time parameter that is different than another of the devices assigned to the logical host group;

to determine a target network time parameter for the logical host group based at least in part on network time parameter related information about a given device of the plurality of devices assigned to the logical host group; and to cause the plurality of devices to configure their respective network time parameters to the target network time parameter based at least in part on the assignment of the plurality of devices to the logical host group;

wherein the logical host group is managed by a device management console;

wherein the program code further causes the at least one processing device:

to issue a command to a support system, the command requesting the network time parameter related information about the given device; and to obtain the network time parameter related information about the given device from the support system in response to the command;

wherein determining the target network time parameter for the logical host group based at least in part on the network time parameter related information about the given device comprises determining the target network time parameter based at least in part on the network time parameter related information obtained in response to the command from the support system; and wherein the program code, when executed by the at least one processing device, further causes the at least one processing device:

to determine that there is a network time parameter mismatch between at least one of the plurality of devices assigned to the logical host group and the device management console; and responsive to the network time parameter mismatch exceeding a designated threshold, to generate an alert.

16. The computer program product of claim 15 wherein the support system comprises a backend technical support system.

17. The computer program product of claim 16 wherein the network time parameter related information comprises a geographical region in which the given device is located.

18. The computer program product of claim 15 wherein causing the plurality of devices to configure their respective network time parameters to the target network time parameter comprises causing the plurality of devices to configure their respective network time parameters to the target network time parameter based at least in part on the determination that there is a network time parameter mismatch between the at least one of the plurality of devices assigned to the logical host group and the device management console.

19. The computer program product of claim 18 wherein determining that there is a network time parameter mismatch in the plurality of devices assigned to the logical host group comprises:

comparing a network time parameter of the device management console to a network time parameter of the at least one of the plurality of devices;

determining, based at least in part on the comparison, that there is a difference between the network time parameter of the device management console and the network time parameter of the at least one of the plurality of devices; and determining that there is a time mismatch based at least in part on the determination that there is a difference between the network time parameter of the device management console and the network time parameter of the at least one of the plurality of devices.

20. The computer program product of claim 15:

wherein the cluster comprises a first cluster;

wherein the device management console is configured to manage a plurality of clusters comprising the first cluster and at least a second cluster; and wherein the program code further causes the at least one processing device:

to assign a second plurality of devices of the second cluster to a second logical host group in the device management console;

to determine a second target network time parameter for the second logical host group on network time parameter related information about a second device of the second plurality of devices assigned to the second logical host group; and to cause the second plurality of devices to configure their respective network time parameters to the second target network time parameter based at least in part on the assignment of the second plurality of devices to the second logical host group.

* * * * *